April 13, 1937.   H. RAMBAUSEK   2,077,058
FRICTION COUPLING FOR CHANGE GEARS
Filed May 16, 1935   3 Sheets-Sheet 1

INVENTOR
HUGO RAMBAUSEK
by Walter S. Bleistein
ATTORNEY

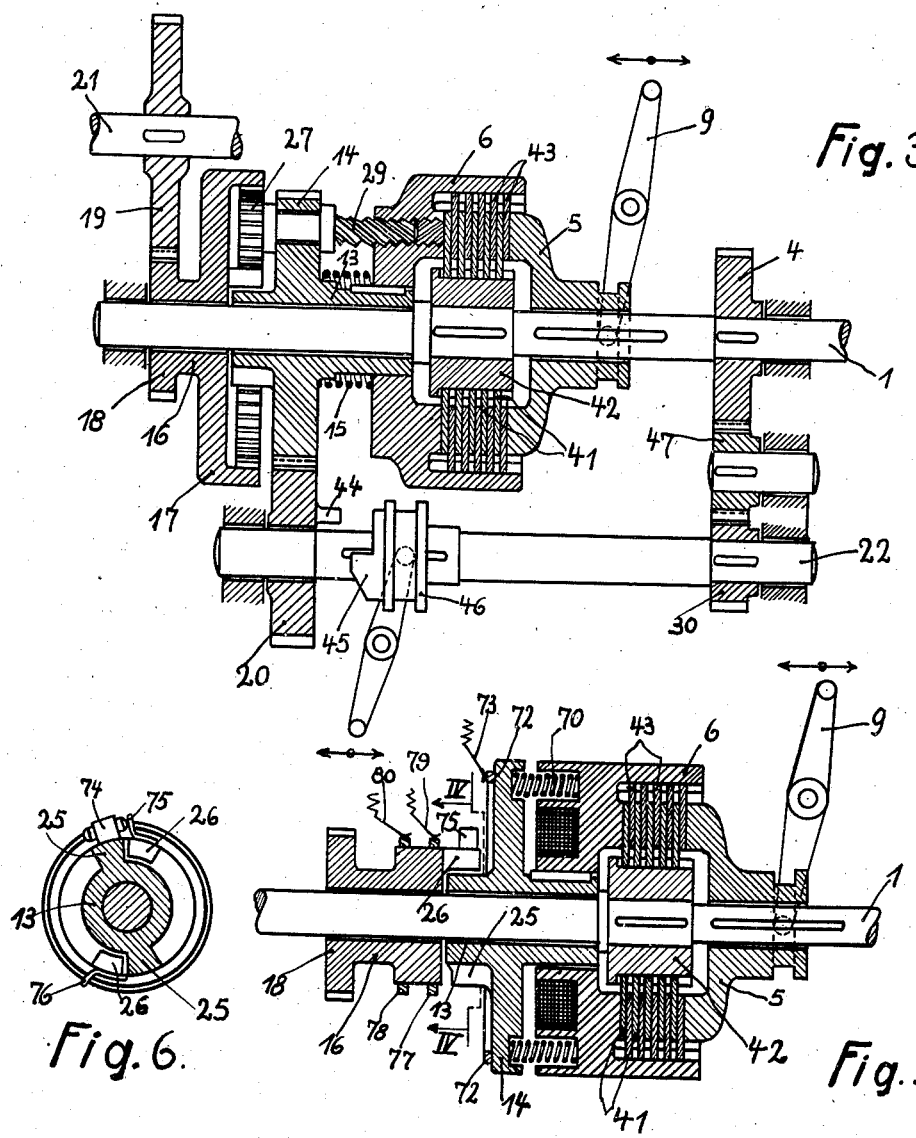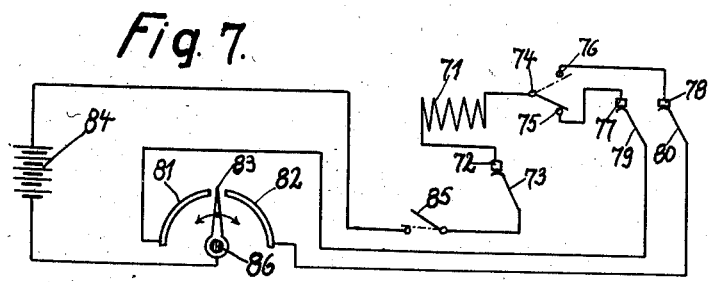

April 13, 1937. H. RAMBAUSEK 2,077,058
FRICTION COUPLING FOR CHANGE GEARS
Filed May 16, 1935 3 Sheets-Sheet 3

INVENTOR
Hugo Rambausek
BY
ATTORNEY

Patented Apr. 13, 1937

2,077,058

UNITED STATES PATENT OFFICE 2,077,058

FRICTION COUPLING FOR CHANGE GEARS

Hugo Rambausek, Eberswalde, near Berlin, Germany

Application May 16, 1935, Serial No. 21,765
In Germany December 30, 1933

14 Claims. (Cl. 74—358)

My invention relates to friction couplings for change gears and more particularly to friction couplings for change gears in which changing over can be carried out without an interruption of the transmission of power. This is obtained by providing a plurality of gears between the driving and driven shafts, each gear being associated with a coupling. In operation one of the gears is put in by engaging the coupling associated therewith. For changing over to another gear the coupling associated therewith is engaged the first gear being automatically thrown out as soon as the power is transmitted by the other gear. On the other hand the first gear is automatically put in when the coupling associated with the second gear is disengaged.

It is an object of my invention to provide a friction coupling which is particularly suitable for use in change gears of the kind referred to. The friction coupling according to my invention involves the advantage of operating in a soft manner and without shock even at high torques. Besides this the construction of the friction coupling according to my invention is very simple and cheap.

In the friction coupling according to my invention there are provided a driving member and a driven member which are both axially displaceable, one of the members being axially displaceable by externally operated means while the axial position of the other member is controlled in response to the direction of the force transmitted between said other member and the gear associated therewith as such force changes its direction depending upon whether the said other member or the associated gear tends to overrun the gear or the other member respectively. For instance the first member may be displaceable by hand, the other member being withdrawn from the first one when the direction of the force between said other member and the gear associated therewith is reversed.

In a preferred embodiment of my invention the position of the second coupling member is controlled by means of an auxiliary member arranged for a limited reciprocation between two end positions in response to the direction of the force between said second coupling member and the gear associated therewith. The reciprocation of the auxiliary member may be limited by means of suitable stops.

The coupling according to my invention may be designed and arranged so as to be disengaged when the relative rotations of the driving and driven members are changed in a predetermined manner, for instance when the speed of the driven member exceeds that of the driving member or when the direction of the rotation of the driven member is reversed.

Other objects of my invention will appear from the following description and claims.

In the drawings affixed hereto and forming part of this specification some embodiments of my invention are illustrated diagrammatically by way of example.

In the drawings:

Fig. 1 is a side elevation partly in section, of a two-speed gear comprising a friction coupling according to my invention which is automatically disengaged when the high speed is put in.

Fig. 3 is a sectional elevation, similar to Fig. 1, of another embodiment of my invention, the coupling being automatically disengaged when the rotation of the driven member is reversed.

Fig. 5 is a sectional elevation, similar to Fig. 4, of a fourth, electrically operated embodiment the operation of which is independent of the direction of rotation of the driving member.

Fig. 6 is a cross-section of the device shown in Fig. 5 along the lines VI—VI.

Fig. 7 is a wiring diagram of the electrical circuit associated with the device shown in Fig. 5.

Figure 1:
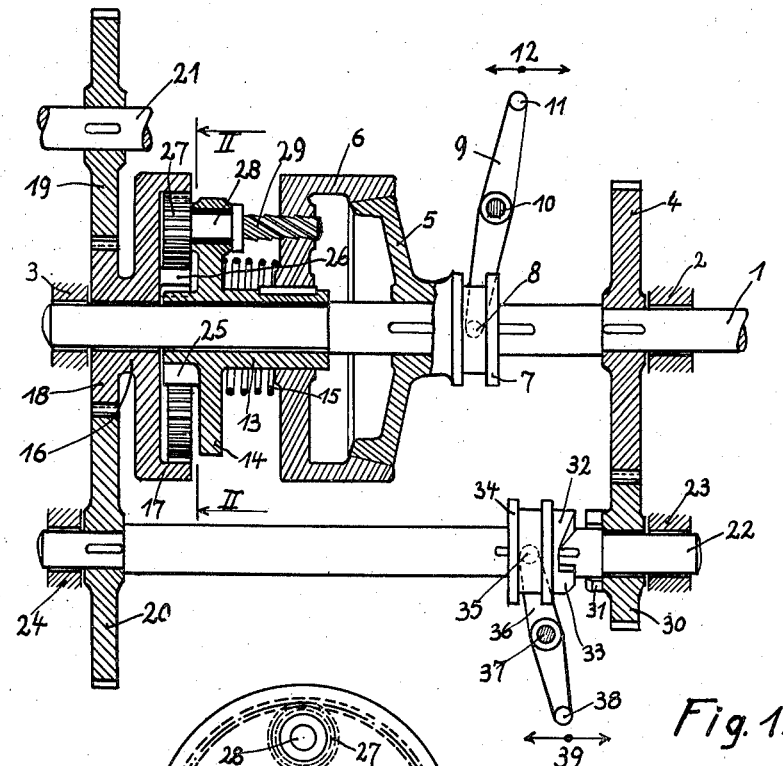

Referring now to the drawings and first to Fig. 1, I is a driving shaft running in bearings 2 and 3. 4 is a toothed wheel secured to the shaft I. 5 is the driving member of a friction coupling the driven member of which is designated by 6. The driving member 5 is arranged axially displaceable on the shaft I so as to rotate therewith. The driving member 5 is provided with a grooved collar 7 engaged by the forked end 8 of a double-armed lever 9 fulcrumed at 10. The outer end 11 of the lever 9 may be moved to and fro in the direction of the arrows 12 so as to axially displace the driving coupling member 5 on the shaft 1 thereby engaging and disengaging the driven member 6. The driving and driven coupling members engage each other with conically shaped friction surfaces as will be seen from Fig. 1. 13 is a sleeve arranged loose, but axially undisplaceable on the shaft 1 and provided near its left hand end with a circular flange 14. The driven coupling member is mounted axially displaceable on the upper portion of the sleeve 13 so as to rotate therewith. 15 is a helical spring interposed between the driven coupling member 6 and the flange 14 of the sleeve 13. 16 is another sleeve arranged loose, but axially undisplaceable on the shaft 1 adjacent to the sleeve 13. The right hand portion of the sleeve 16 is provided with a horizontal flange 17 the inner surface of which is toothed. The left hand portion of the sleeve 16 forms a transmission member or toothed wheel 18 engaging two other transmission members or toothed wheels 19 and 20 splined to the driven shaft 21 and to a lay shaft 22, respectively. The bearings of the driven shaft 21 are not shown, while the bearings of the lay shaft 22 are designated by 23 and 24, respectively. Both the sleeves 13 and 16 are provided with a pair of dogs 25 and 26, respectively, which are arranged so that each sleeve will transmit its rotation to the other one with a certain amount of lost motion. Obviously by this construction the sleeves are free for a limited rotation with respect to each other. 27 are pinions meshing with the toothed inner surface of the flange 17 and mounted loose with their shafts 28 in borings provided in the circular flange 14 of the sleeve 13, respectively. The right hand portions 29 of the shafts 28 are threaded at a high pitch and engage correspondingly threaded bores provided in the driving coupling member 6. 30 is a toothed wheel arranged loose on the lay shaft 22 so as to engage the toothed wheel 4. The wheel 30 is provided with coupling dogs 31 adapted for engagement with a coupling member 32 arranged axially displaceable, but unrotatable on the lay shaft 22 and provided with dogs 33 and a grooved collar 34 engaged by the forked end 35 of an actuating lever 36 fulcrumed at 37 so that the coupling member 32 may be brought into and out of engagement by reciprocating the end 38 of the lever 36 in the direction of the arrows 39.

Figure 2:
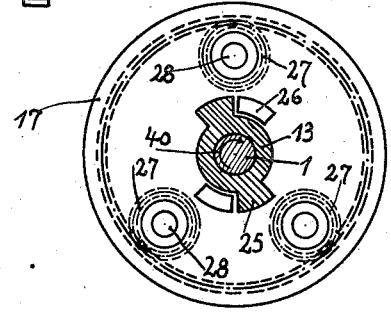
Fig. 2 is a cross-section of the device shown in Fig. 1 along the lines II—II.

The shaft 1 is driven by an engine (not shown) or the like in the direction of the arrow 40 (Fig. 2). In order to drive the driven shaft 21 at a low speed the friction coupling is brought to engagement by axially displacing the driving member 5 by means of the lever 9 so that all parts occupy the positions shown in Fig. 1, shaft 21 being driven from shaft 1 through the coupling members 5, 6, shafts 29, sleeve 13, dogs 25, 26, sleeve 16 and wheels 18, 19. In order to change over from a low speed to a high one the coupling member 32 is brought to engagement with the toothed wheel 30 by rocking the lever 36. Then the speeds of the wheels 18, 19 and the shaft 21 will be increased owing to the dimensions of the toothed wheels 4, 30, 20 and 18. In consequence thereof the sleeve 16 is angularly displaced with respect to the sleeve 13 to an extent determined by the lost motion existing between the dogs 25 and 26. By the angular displacement of the sleeves with respect to each other the pinions 27, the shafts 28 of which are mounted in the flange 14 of the sleeve 13, are rotated and impart an axial displacement to the driven coupling member 6 against the force of the spring 15 by the rotation of the threaded extensions 29 of the pinion shafts so that the friction coupling will be disengaged. When it is desired to change back to the lower speed the coupling member 32 is disengaged so as to occupy the position shown in Fig. 1, so that energy is no longer transmitted to the toothed wheel 18 through the wheels 30 and 20. Thus the speed of the sleeve 16 will decrease while the tensioned spring 15 tends to expand. Due to the high pitch of the threads of the extensions 29 the spring 15 may expand thereby causing a rotation of the pinions 27 about their axes. At the same time the sleeves are angularly displaced with respect to each other so as to occupy their initial relative positions shown in Fig. 2 while the driven coupling member 6 is brought to engagement with the driving member 5. In order to stop the driven shaft 21 the friction coupling may be disengaged by withdrawing the driving member 5 by means of the lever 9.

It is to be understood that the holding force of the friction coupling is practically independent of the value of the torque to be transmitted since the amounts of the relative angular displacement of the sleeves and of the axial displacement of the driven member 6 are determined by the engagements of the dogs 25 and 26 operating as stops for limiting the reciprocating movement of the sleeves and the driven member. Thus an increase of torque cannot cause an increase of the axial displacement of the driven coupling member or of the frictional engagement of the coupling members.

Referring now to Fig. 3 the device shown in this figure substantially corresponds to that shown in Fig. 1 excepting two modifications. The first modification consists in that a multiple disc coupling is provided instead of the conical friction coupling shown in Fig. 1. The inner discs 41 are secured to a member 42 splined to the driving shaft 1 while the outer discs 43 are secured to the driven coupling member 6. The driving coupling member 5 is arranged so as to exert in its left hand position a clutch pressure so that the coupling is engaged. The other modification resides in that the automatic disengagement of the friction disc coupling takes place on a reversal of the direction of the rotation of the sleeve 13. In order to accomplish this the circular flange 14 of the sleeve 13 is externally toothed and engages the toothed wheel 20 loosely mounted on the lay shaft 22 and provided with coupling dogs 44 which may be engaged by the dogs 45 of a coupling member 46 arranged axially displaceable on the lay shaft 22 to the right hand end of which the toothed gear 30 is splined which engages an intermediate toothed wheel 47 meshing with the toothed wheel 4 splined to the driving shaft 1.

The operation of this device is substantially the same as that of the device shown in Fig. 1 except that by an engaging of the coupling member 46 the rotation of the driven shaft is reversed. This device is particularly useful in connection with machine tools for driving reciprocating members for which the maintenance of definite reversing or turning points is required.

It is to be understood that instead of the dog couplings 32, 45 shown in Figs. 1 and 3, friction couplings may be provided, if desired.

Figure 4:
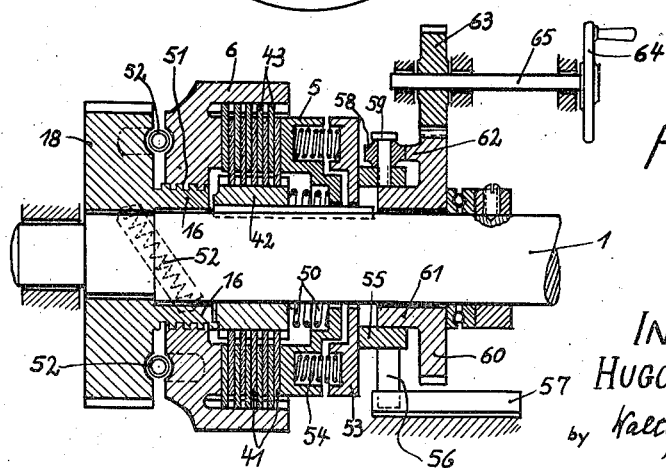
Fig. 4 is a sectional elevation of a third embodiment of my invention, the driven shaft and the second gear for driving the driven coupling member being not shown. This coupling is automatically disengaged when the driven member rotates at a higher speed than the driving member and may be re-engaged by hand after such a disengagement.

Referring now to Fig. 4 in which the driven and lay shafts and the toothed wheels mounted on them are not shown the friction coupling is designed as a multiple disc coupling similar to that shown in Fig. 3 and comprises the driving member 5 axially displaceably secured to the driving shaft 1 and inner and outer discs 41, 43 secured to the member 42 and the driven coupling member 6, respectively. 50 is a helical spring interposed between the driving member 5 and the member 42 splined to the shaft 1. In this embodiment the driven member 6 is directly connected to the sleeve 16 by means of a high-pitch thread 51 allowing a limited angular reciprocation of the sleeve 16 and the driven member 6 with respect to each other by which the driven member 6 is axially displaced in order to engage or disengage the coupling. 52 are helical springs arranged inclined in suitable recesses provided in the sleeve 16 and the driven member 6, respectively. 53 is a ring mounted axially displaceable, but unrotatable on the shaft 1 and connected to the driving member 5 by means of helical springs 54 arranged in suitable recesses of the ring and the driving member, respectively. 55 is another ring secured against rotation by means of an extension 56 engaging a groove 57 arranged parallel to the shaft 1. 58 is a roller rotatably mounted on a pin 59 projecting from the side wall of the ring 55. 60 is a toothed wheel loosely mounted on the shaft 1, the hub of which is provided with an extension 61 engaging the interstice between the shaft 1 and the ring 55. At its left hand surface the wheel 60 is provided with an inclined or curved cam surface 62 engaging the roller 58. 63 is a toothed wheel meshing with the wheel 60. 64 is a hand-operated wheel mounted on the shaft 65 of the wheel 63. If desired, a plurality, for instance three rollers 58 may be provided cooperating with a corresponding number of cam surfaces congruent to each other.

The operation of this device is as follows:
By rotating the hand wheel 64 the ring 55 may be moved to and fro since it is pressed to the right by the helical springs and the roller 58 slides on the cam surface 62. In consequence thereof the multiple disc coupling inserted between the coupling members 5 and 6 may be brought to engagement by screwing the ring 55 to the left. It is to be understood that even at a slight pressure exerted by the member 5 on the discs 41, 43 the driven coupling member 6 in the event that it is not in its coupling position will be rotated in such a direction that the friction between the discs 41, 43 will be increased. This motion will be aided by the springs 52 acting in the direction of the thread 51. When the driven coupling member 6 has reached its coupling position the springs 54 are tensioned to an extent sufficient for the transmission of the torque. When the toothed wheel 18 forming part of the sleeve 16 is driven at a higher speed than that of the driven shaft 1 it will be screwed along the thread 51 so that the multiple disc coupling will be automatically disengaged. So far the operation is substantially the same as that of the embodiments heretofore described. The device shown in Fig. 4, however, differs from these embodiments in that after such an automatic disengagement the coupling may be re-engaged at will by rotating the hand wheel 64 further so as to screw to the left the rings 55, 53 and the member 5 until the multiple disc coupling is re-engaged. A device of this kind is particularly useful in connection with self-propelled vehicles in which an automatic disengagement of the friction coupling will occur not only when the driver changes over from a low speed to a high one but also when the vehicle runs on a sloping road. In such cases it is desirable to use the engine of the car as a brake but in order to do so it is necessary to re-engage the friction coupling which can be done in the manner described.

In the embodiments described heretofore the members of the coupling are actuated by mechanical means. If desired, however, instead of mechanical means hydraulic, pneumatical or electric means may be used. An embodiment of my invention in which electromagnetic means are provided for the automatic disengagement of the coupling is shown in Figs. 5 to 7.

In the embodiment shown in Figs. 5 to 7 an automatic disengagement of the friction coupling takes place whenever the driven coupling member rotates at a higher speed than the driving coupling member. In contradistinction to the embodiments illustrated in Figs. 1 to 4 the automatic disengagement is independent from the direction of the rotation of the driving shaft. Thus the device shown in Figs. 5 to 7 may be advantageously used in transmission with a plurality of speeds for the forward as well as for the return drive particularly in consideration of the fact that it allows to change over without interrupting the transmission of power.

The construction of the right hand portion of the coupling including the driving coupling member 5, the multiple disc coupling 41, 42, 43 and the driven coupling member 6 corresponds substantially to the embodiment shown in Fig. 3. The connections, however, between the sleeves 16, 13 and the driven coupling member 6 are modified in the manner now to be described. 70 are helical springs inserted between the sleeve 13 and the driven coupling member 6 which tend to hold the driven member in its coupling position. The sleeve 13 and the driven member 6 both consist of magnetic material such as soft iron. 71 is a current winding arranged in a suitable groove of the driven coupling member. This current winding will be energized in the manner described hereinafter when the speed of the driven member tends to exceed that of the driving member. Then a magnetic flux will be produced by which the coupling member 6 is drawn to the left against the force of the springs 70 so that the multiple disc coupling will be disengaged.

One terminal of the current winding 71 is connected to a slip ring 72 which is mounted insulated on the surface of the flange 14 of the sleeve 13 and is in contact with a slide contact 73. The sleeves 13 and 16 are provided with dogs 25 and 26 operating in the same manner as more fully described in connection with Figs. 1 and 2 except that they are provided with contact members for closing and interrupting the circuit of the current winding 71. The other terminal of the winding 71 is connected to a contact member 74 mounted insulated on one of the dogs 25 of the sleeve 13. The dogs 26 of the sleeve 16 are provided with contact members 75 and 76, respectively, which in turn are connected to slip rings 77 and 78, respectively, which are mounted insulated on the sleeve 16. 79 and 80 are contacts sliding on the slip rings 77 and 78, respectively, which are connected to stationary contact segments 81, 82, respectively, forming part of a two-position switch the movable contact 83 of which is connected to one terminal of a current supply 84, the other terminal of which is connected through a hand-operated switch 85 to the contact 73 sliding on the slip ring 72.

Figure 8:
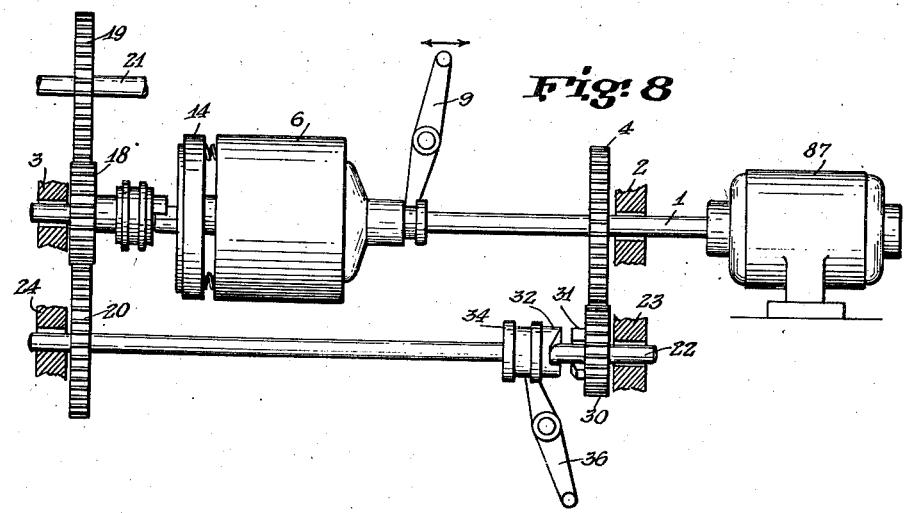
Fig. 8 is a side elevation of a two-speed gear with a friction clutch as shown in Fig. 5.

Fig. 8 shows a transmission with a clutch as illustrated in Fig. 5. An electromotor 87 is shown as the power source driving shaft 1. It is to be understood, however, that any other suitable engine may be used instead of an electromotor. The movable contact 83 may be connected to the shaft 86 of the controller drum (not shown) as conventionally used for controlling an electromotor so that contact 83 will be in contact with one of the segments 81, 82 according as the motor is controlled so as to supply forward or return drive. If another type of engine is employed, contact 83 may be connected with any suitable member controlling the engine.

In operation the switch 85 is normally closed. As will be seen from Fig. 7 one of the slide contacts 79, 80 and the slip rings 77, 78 will be connected to the positive terminal of the current supply 84 when the movable contact 83 is in contact with one of the contact segments 81, 82. Be it assumed that during a forward drive the movable contact 83 is in contact with the segment 82 while during a return drive the movable contact 83 is in contact with the segment 81. Thus during a forward drive the contact member 76 will be connected to the current supply while during a return drive the contact member 75 will be connected to the current supply. When during a forward drive the coupling members rotate at the same speed, power being transmitted through the friction coupling, the relative positions of the sleeves 13 and 16 will be that shown in Fig. 6 in which contact member 74 is in contact with contact member 75. In this position no current will flow through winding 71 since the circuit is interrupted at the contact segment 81, movable contact member 83 being in contact with segment 82. When during a forward drive the sleeve 16 is accelerated as more fully described in connection with Fig. 1 the relative positions of the sleeves 16 and 13 will be changed so that contact member 74 will strike contact member 76. Then a circuit containing winding 71 will be closed, this circuit including contacts 74, 76, slip rings 78, sliding contact 80, contact segment 82, movable contact 83, current supply 74, switch 85, sliding contact 73, slip ring 72 and current winding 71. In consequence thereof the current winding is energized and causes a disengaging of the friction coupling as described above.

During a return drive contact member 74 is in contact with contact member 76 when the coupling members rotate at the same speed. The current winding 71, however, is not energized because in this case movable contact 83 is in contact with contact segment 81, and out of contact with segment 82. When during a return drive sleeve 16 is driven at a higher speed contact member 74 will strike contact 75 and the winding 71 will be energized, the circuit including besides contacts 74 and 75 the contact segment 81 and the movable contact 83.

If it is desired to re-engage the coupling after an automatic disengaging, switch 85 may be opened. Besides this switch 85 may be used for bringing the driven coupling member 6 in coupling position for starting purposes in the event that the winding 71 is energized at the moment of starting.

If desired the switching devices 74, 75, 76 may be connected to the driving shaft 1 and to the sleeve 16, respectively. Although the relative movement between the shaft 1 and the sleeve 16 is not limited the operation of the switching members 74, 75 and 76 if connected to these parts may be rendered dependent on the relative movement of these parts by means of frictional switches or the like.

Figure 6A:
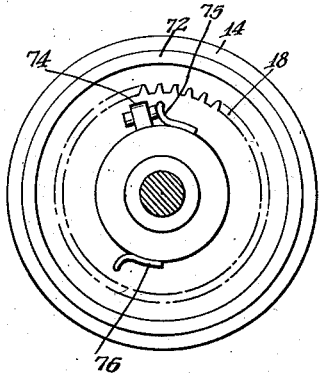
Figs. 5a and 6a are sectional elevation and front view respectively of a modification of the switching means of an embodiment according to Fig. 5.
Figure 5A:
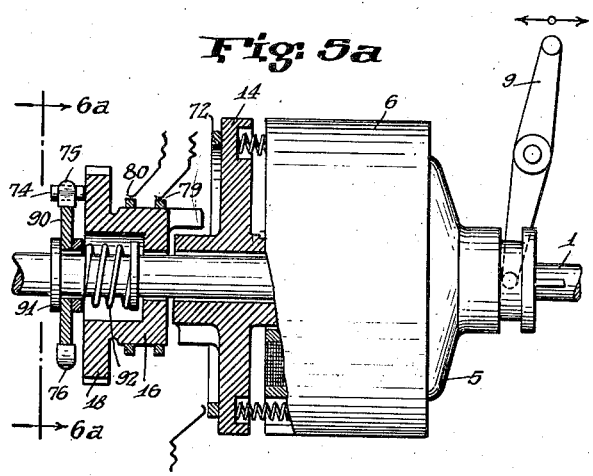

In the arrangement of Figs. 5a and 6a the switching devices 75 and 76 are connected to the driving shaft 1 by means of a friction plate 90 pressed against a collar 91 by means of a spring 92, and the contact member 74 is carried by gear 18 which is integral with sleeve 16. The parts 74, 75, 76 are connected with the slip rings 72, 79, 80 as in the wiring diagram of Fig. 7.

It should be understood that instead of a lever other devices, for instance hand-operated electromagnetic means may be provided for operating the driving coupling member 5.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A friction coupling for change gears comprising a driving coupling member, a driven coupling member, a rotatable third member, said three members being coaxially arranged, said coupling members being individually displaceable axially in relation to each other and to said third member, externally operated means for displacing one of said coupling members, means in connection with said other coupling member and said third member for transmitting rotative forces between these last mentioned members, and adapted to permit a limited relative rotation of these members, and means rotatable with one of the last mentioned members and responsive to their relative rotation for axially displacing said other coupling member.

2. A friction coupling for change gears comprising a driving coupling member, a driven coupling member, a rotatable auxiliary member, a gear member, said members being coaxially arranged, externally operated means for axially displacing one of said coupling members, said other coupling member being axially displaceable in relation to and connected for rotation with said auxiliary member, said auxiliary member being arranged for a limited rotation in relation to said gear member between two end positions, means rotatable with said auxiliary member and responsive to the relative movement between said auxiliary member and said gear member for controlling the axial position of said other coupling member.

3. A friction coupling for change gears comprising a driving coupling member, a driven coupling member, a rotatable auxiliary member, a gear member, said members being coaxially arranged, externally operated means for axially displacing one of said coupling members, said other coupling member being axially displaceable in relation to and connected for rotation with said auxiliary member, said auxiliary member being arranged for a limited rotation in relation to said gear member between two end positions, means rotatable with said auxiliary member and responsive to the relative movement between said auxiliary member and said gear member for controlling the axial position of said other coupling member, said controlling means comprising a high pitch threaded connection between said auxiliary member and said other coupling member.

4. A friction coupling for change gears comprising a driving coupling member, a driven coupling member, a rotatable auxiliary member, a gear member, said members being coaxially arranged, externally operated means for axially displacing one of said coupling members, said other coupling member being axially displaceable in relation to and connected for rotation with said auxiliary member, said auxiliary member being arranged for a limited rotation in relation to said gear member between two end positions, means rotatable with said auxiliary member for moving said other coupling member from one end position to the other one, means responsive to the direction of the forces transmitted between said auxiliary member and said gear member, and including duplicate means rotatable with one of the two last mentioned members, and means rotatable with the other one of the two last mentioned members and cooperative with said duplicate means for controlling said moving means, and external means for rendering inoperative the one or the other one of said duplicate means.

5. A friction coupling for change gears comprising a driving coupling member, a driven coupling member, a rotatable auxiliary member, a gear member, said members being coaxially arranged, externally operated means for axially displacing one of said coupling members, said other coupling member being axially displaceable in relation to and connected for rotation with said auxiliary member, said auxiliary member being arranged for a limited rotation in relation to said gear member between two end positions, means rotatable with said auxiliary member and responsive to a change of the direction of the force transmitted between said auxiliary member and said gear member for moving said auxiliary member from one end position to the other one, electromagnetic means in connection with said other coupling member for controlling the axial position of the other member, switching means connected to said auxiliary member for connecting and disconnecting said electromagnetic means to a current supply.

6. A friction coupling for change gears comprising a driving coupling member, a driven coupling member, a rotatable auxiliary member, a gear member, said members being coaxially arranged, externally operated means for axially displacing one of said coupling members, said other coupling member being axially displaceable in relation to and connected for rotation with said auxiliary member, said auxiliary member being arranged for a limited rotation in relation to said gear member between two end positions, means rotatable with said auxiliary member and responsive to a change of the direction of the force transmitted between said auxiliary member and said gear member for moving said auxiliary member from one end position to the other one, electromagnetic means in connection with said other coupling member for controlling the axial position of the other member, switching means connected to said auxiliary member for connecting and disconnecting said electromagnetic means to a current supply, and means rotatable with said auxiliary member and responsive to the direction of rotation of said driving and driven members for rendering inoperative one of said switching means.

7. A friction coupling for change gears comprising a driven coupling member, a driving coupling member adapted to drive the driven coupling member, additional means apart from said driving member for driving said driven coupling member, externally operated means for axially displacing said driving coupling member, an auxiliary member connected for rotation with said driven coupling member, a gear member arranged for a limited rotation with said auxiliary member between two end positions, and means rotatable with said auxiliary member and responsive to the direction of the force transmitted between said auxiliary member and said gear member for controlling the axial position of said other coupling member so as to disengage the coupling when said additional driving means impart to said driven member a speed exceeding that of said driving member.

8. A friction coupling for change gears comprising a driven coupling member, a driving coupling member adapted to drive the driven coupling member, additional means apart from said driving member for driving said driven coupling member, externally operated means for axially displacing one of said coupling members, an auxiliary member connected for rotation with said driven coupling member, a gear member arranged for a limited rotation with said auxiliary member between two end positions, means rotatable with said auxiliary member and responsive to the direction of the force transmitted between said auxiliary member and said gear member for controlling the axial position of said other coupling member so as to disengage the coupling when said additional driving means impart to said driven member a speed exceeding that of said driving member, and externally operated means for axially displacing one of said coupling members whereby the engagement of said driving and driven member may be re-established after the disengagement of the coupling by said direction responsive means.

9. A friction clutch comprising a driving coupling member and a driven coupling member, each of said coupling members being individually movable in axial direction into a position of disengagement and into a position for engagement, in combination with a change gear transmission including a rotatable transmission member with which said clutch is associated, externally operated means for axially moving said driving coupling member, a lost motion connection between said driven coupling member and said transmission member, whereby rotative forces may be transmitted between said two last mentioned members in either direction, and means connected to at least one of said two last mentioned members, and responsive to the direction of the forces transmitted through said lost motion connection for controlling the position of said driven coupling member.

10. A friction clutch comprising a driving coupling member and a driven coupling member, each of said coupling members being individually movable in axial direction into a position of disengagement and into a position for engagement, in combination with a change gear transmission including a rotatable transmission member with which said clutch is associated, externally operated means for axially moving said driving coupling member, an auxiliary member connected for rotation with said driven coupling member, a lost motion connection between said driven coupling member and said transmission member, whereby rotative forces may be transmitted between said two last mentioned members in either direction, and means in connection with said auxiliary member and said transmission member and responsive to the direction of the forces transmitted through said lost motion connection for controlling the position of said driven coupling member.

11. A friction clutch comprising a driving coupling member and a driven coupling member, each of said coupling members being individually movable in axial direction into a position of disengagement and into a position for engagement, in combination with a change gear transmission including a first rotatable transmission member with which said friction clutch is associated, a second transmission member connected for rotation with said first transmission member, externally operated means for axially moving said driving coupling member, a lost motion connection between said driven coupling member and said first transmission member, whereby rotative forces may be transmitted between said two last mentioned members in either direction, and means connected to at least one of said two last mentioned members, and responsive to the direction of the forces transmitted through said lost motion connection for controlling the position of said driven coupling member, whereby said driven coupling member is being moved into its position of disengagement when said first transmission member driven by said second transmission member overruns said driven coupling member.

12. A friction clutch comprising a driving coupling member and a driven coupling member, each of said coupling members being individually movable in axial direction into a position of disengagement and into a position for engagement, in combination with a change gear transmission including a rotatable transmission member in coaxial arrangement with said driven coupling member and being unmovable in axial direction, externally operated means for axially moving said driving coupling member, a high pitch threaded connection coaxially arranged between said driven coupling member and said transmission member for transmitting rotative forces between said two last mentioned members, said thread having such a direction as to move said driven coupling member into its position of disengagement when said transmission member overruns said driven coupling member, and resilient means bearing against said driven coupling member and tending to move it into its position for engagement.

13. A friction clutch comprising a driving coupling member and a driven coupling member, each of said coupling members being individually movable in axial direction into a position of disengagement and into a position for engagement, in combination with a change gear transmission including a rotatable transmission member with which said clutch is associated, externally operated means for axially moving said driving coupling member, electromagnetic means in connection with said driven coupling member for moving it in axial direction, a lost motion connection between said driven coupling member and said transmission member, contact means rotatively connected with said driven coupling member, and counter-contact means rotatively connected with said transmission member for connecting said electromagnetic means to a current supply, whereby said electromagnetic means are being energized to move said driven coupling member into its position of disengagement when said transmission member overruns said driven coupling member.

14. A friction clutch device as claimed in claim 13 in which said contact means is provided in duplicate and said counter-contact means is so arranged as to engage one of said contact means when said transmission member tends to overrun said driven coupling member in one direction of rotation, and as to engage the other contact means when said transmission member tends to overrun said driven coupling member in the other direction of rotation, external switching means being provided for rendering inoperative one or the other one of said contact means.

HUGO RAMBAUSEK.